United States Patent
Autti et al.

(10) Patent No.: US 9,313,010 B2
(45) Date of Patent: Apr. 12, 2016

(54) CONTROLLING TX ANTENNA SELECTION

(71) Applicant: Broadcom Corporation, Irvine, CA (US)

(72) Inventors: Marko Tapio Autti, Oulu (FI); Seppo Rousu, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 17 days.

(21) Appl. No.: 13/923,677

(22) Filed: Jun. 21, 2013

(65) Prior Publication Data

US 2014/0376455 A1  Dec. 25, 2014

(30) Foreign Application Priority Data

Jun. 29, 2012 (GB) .................................. 1211597.8
Jan. 28, 2013 (GB) .................................. 1301486.5

(51) Int. Cl.
*H04L 5/00* (2006.01)
*H04L 27/28* (2006.01)
*H04B 17/00* (2015.01)

(52) U.S. Cl.
CPC .............. *H04L 5/0058* (2013.01); *H04B 17/00* (2013.01); *H04L 27/28* (2013.01)

(58) Field of Classification Search
CPC ............ H04W 52/143; H04W 52/146; H04W 52/367; H04L 5/0073
USPC .......................... 370/310–329; 455/460–509
See application file for complete search history.

(56) References Cited

U.S. PATENT DOCUMENTS

| 5,537,672 A | * | 7/1996 | Grabow et al. ............... 455/132 |
| 6,392,595 B1 | * | 5/2002 | Katz et al. ..................... 342/367 |
| 7,079,809 B1 | * | 7/2006 | Scherzer ......................... 455/39 |
| 2006/0018288 A1 | | 1/2006 | Luo et al. |
| 2008/0051149 A1 | * | 2/2008 | Mehta et al. ............... 455/562.1 |
| 2009/0003475 A1 | | 1/2009 | Erceg |
| 2010/0215088 A1 | | 8/2010 | Park et al. |
| 2010/0322328 A1 | * | 12/2010 | Schirmacher et al. ........ 375/260 |
| 2012/0106613 A1 | * | 5/2012 | Piazza et al. .................. 375/227 |

FOREIGN PATENT DOCUMENTS

| EP | 1742383 | 1/2007 |
| EP | 2015467 | 1/2009 |
| EP | 2424125 | 2/2012 |
| EP | 2445120 | 4/2012 |
| KR | 20060051451 | 5/2006 |

(Continued)

OTHER PUBLICATIONS

3GPP TS 36.213 v11.2.0 (Feb. 2013); 3rd Generation Partnership Project; Technical Specification Group Radio Access Network; Evolved Universal Terrestrial Radio Access (E-UTRA); Physical Layer Procedures (Release 11); p. 116—section 8.7.

*Primary Examiner* — Charles C Jiang
*Assistant Examiner* — Kyaw Z Soe
(74) *Attorney, Agent, or Firm* — Oblon, McClelland, Maier & Neustadt, L.L.P.

(57) ABSTRACT

Measures for controlling uplink antenna selection in a user equipment comprising at least two antennas. At the user equipment, at least two radio wave signals are received, fading conditions in relation to the received at least two radio wave signals are detected and uplink antenna selection in the user equipment is controlled at least on the basis of the detected fading conditions.

22 Claims, 6 Drawing Sheets

(56) References Cited

FOREIGN PATENT DOCUMENTS

| | | |
|---|---|---|
| KR | 20090090451 | 8/2009 |
| WO | 03023977 | 3/2003 |
| WO | 2009041759 | 4/2009 |
| WO | 2009080057 | 7/2009 |

* cited by examiner

CONTROLLING TX ANTENNA SELECTION

CROSS REFERENCE TO RELATED APPLICATIONS

This application claims benefit under 35 U.S.C. §119(a) and 37 CFR 1.55 to UK patent application no. GB 1211597.8, filed on 29 Jun. 2012, and UK patent application no. GB 1301486.5 filed on 28 Jan. 2013, the entire contents of which are hereby incorporated by reference.

TECHNICAL FIELD

The present disclosure relates to antenna control. In particular, but not exclusively, the present disclosure relates to methods, apparatus, computer software and computer program products for controlling uplink antenna selection in a user equipment comprising at least two antennas.

BACKGROUND

Signal propagation conditions alter according to fading conditions. In radio paths, fading conditions can be divided into line of sight conditions (LOS) and rich scattering fading conditions (NLOS, not line of sight). From a terminal uplink performance point of view, it is desirable to achieve good cell coverage and data throughput. Operating at cell edges, especially in rural areas, can lead to a situation where an uplink connection to a base station is dropped. In some cases, objects may be located between a TX antenna and a BTS within a cell, which leads to a counterpart received signal being attenuated close to or below sensitivity level. It would therefore be desirable to provide improved TX antenna directivity towards base stations.

In 3G, HSPA, LTE and LTE CA terminals there is typically one TX (i.e. UL) antenna allowed concurrently according to 3GPP TS 36.213 chapter 8.7. Typical implementation is two RX antennas for diversity and MIMO reception.

According to 3GPP TS 36.213 chapter 8.7, if a UE transmit antenna selection is disabled or not supported by the UE the UE shall transmit from UE port 0, if closed-loop UE transmit antenna selection is enabled by higher layers the UE shall perform transmit antenna selection in response to the most recent command received via DCI Format 0, and if a UE is configured with more than one serving cell the UE may assume the same transmit antenna port value is indicated in each DCI format 0 PDCCH grant in a given subframe. If open-loop UE transmit antenna selection is enabled by higher layers, the transmit antenna to be selected by the UE is not specified.

An automotive environment is particularly challenging from a radio link performance point of view because vehicles such as cars tend to move reasonably fast in environments such as urban environments. In some cases, a vehicle cabin may attenuate radio wave propagation.

With regard to vehicles, it has been proposed to place diversity RX antennas in the side (or 'wing') mirrors of a vehicle, but a problem exists in how to control TX antenna selection. If a single TX antenna is placed in a fixed position in one side mirror of the vehicle, then there is an uplink problem with alternate BTSs on the other side of the vehicle. If two TX antennas are employed conveying TX uplink signals between alternate TX antennas, then there is a problem in how to select the optimal TX antenna for UL during operation.

Some prior art systems select the TX antenna according to DL signal strength, but selecting the appropriate TX antenna on the basis of RSSI can be unreliable.

In TDD radio communication systems, TX and RX are conducted at the same frequency, but in FDD, TX and RX are conducted at different frequencies which can impact on path losses. In the time domain, LOS conditions alter slowly, because there is typically a direct link between BTSs and UEs. On the other hand, NLOS radio conditions alter rapidly due to multiple reflections, for example in urban canyons. From an UL antenna selection point of view, a problem exists in that signal reflections may arrive at angles of 360 degrees around a vehicle so selection on the basis of DL RSSI is unreliable. Operating in rich scattering environments, such as urban canyons, can lead to a situation where optimal data throughput is not achieved in UL, because all information is not received at the BTS with a high enough SNR or the call may drop.

It would therefore be desirable to provide improved ways to control TX antenna selection.

SUMMARY

In accordance with first embodiments, there is a method of controlling uplink antenna selection in a user equipment comprising at least two antennas, the method comprising, at the user equipment:
receiving at least two radio wave signals;
detecting fading conditions in relation to the received at least two radio wave signals; and
controlling uplink antenna selection in the user equipment at least on the basis of the detected fading conditions.

In accordance with second embodiments, there is apparatus for use in controlling uplink antenna selection in a user equipment comprising at least two antennas, the apparatus comprising at least one processor, and at least one memory including computer program code, the at least one memory and the computer program code being configured to, with the at least one processor, cause the apparatus at least to, at the user equipment:
receive at least two radio wave signals;
detect fading conditions in relation to the received at least two radio wave signals; and
control uplink antenna selection in the user equipment at least on the basis of the detected fading conditions.

In accordance with third embodiments, there is computer software adapted to perform a method of controlling uplink antenna selection in a user equipment comprising at least two uplink antennas according to the first embodiments.

In accordance with fourth embodiments, there is a computer program product comprising a non-transitory computer-readable storage medium having computer readable instructions stored thereon, the computer readable instructions being executable by a computerized device to cause the computerized device to perform a method of controlling uplink antenna selection in a user equipment comprising at least two uplink antennas according to the first embodiments.

In accordance with fifth embodiments, there is a method for use in controlling uplink antenna selection in a user equipment comprising at least two antennas, the method comprising, at the user equipment:
receiving at least two radio wave signals;
detecting at least one of:
fading conditions in relation to the received at least two radio wave signals, and
one or more motion-related characteristics of the user equipment;

transmitting detection information associated with the at least one of detected fading conditions and one or more detected motion-related characteristics towards a network entity; and receiving uplink antenna selection control information from the network entity, the control information having been generated by the network entity at least on the basis of the detection information transmitted to the network entity and network reception information extracted by the network entity from at least one radio wave signal transmitted from the user equipment to the network entity.

In accordance with sixth embodiments, there is apparatus for use in controlling uplink antenna selection in a user equipment comprising at least two antennas, the apparatus comprising at least one processor, and at least one memory including computer program code, the at least one memory and the computer program code being configured to, with the at least one processor, cause the apparatus at least to, at the user equipment:

receive at least two radio wave signals;

detect at least one of:
fading conditions in relation to the received at least two radio wave signals, and
one or more motion-related characteristics of the user equipment;

transmit detection information associated with the at least one of detected fading conditions and one or more detected motion-related characteristics towards a network entity; and receive uplink antenna selection control information from the network entity, the control information having been generated by the network entity at least on the basis of the detection information transmitted to the network entity and network reception information extracted by the network entity from at least one radio wave signal transmitted from the user equipment to the network entity.

In accordance with seventh embodiments, there is computer software adapted to perform a method of controlling uplink antenna selection in a user equipment comprising at least two uplink antennas according to the fifth embodiments.

In accordance with eighth embodiments, there is a computer program product comprising a non-transitory computer-readable storage medium having computer readable instructions stored thereon, the computer readable instructions being executable by a computerized device to cause the computerized device to perform a method of controlling uplink antenna selection in a user equipment comprising at least two uplink antennas according to the fifth embodiments.

In accordance with ninth embodiments, there is a method for use in controlling uplink antenna selection in a user equipment comprising at least two antennas, the method comprising, at a network entity:

receiving detection information transmitted from the user equipment associated with at least one of:
fading conditions detected by the user equipment in relation to at least two radio wave signals received at the user equipment, and
one or more motion-related characteristics of the user equipment detected by the user equipment;

extracting network reception information from at least one radio wave signal received from the user equipment;

generating uplink antenna selection control information at least on the basis of the received detection information and the extracted network reception information; and transmitting the generated uplink antenna selection control information to the user equipment.

In accordance with tenth embodiments, there is apparatus for use in controlling uplink antenna selection in a user equipment comprising at least two antennas, the apparatus comprising at least one processor, and at least one memory including computer program code, the at least one memory and the computer program code being configured to, with the at least one processor, cause the apparatus at least to, at a network entity:

receive detection information transmitted from the user equipment associated with at least one of:
fading conditions detected by the user equipment in relation to at least two radio wave signals received at the user equipment, and
one or more motion-related characteristics of the user equipment detect by the user equipment;

extract network reception information from at least one radio wave signal received from the user equipment;

generate uplink antenna selection control information at least on the basis of the received detection information and the extracted network reception information; and transmit the generated uplink antenna selection control information to the user equipment.

In accordance with eleventh embodiments, there is computer software adapted to perform a method of controlling uplink antenna selection in a user equipment comprising at least two uplink antennas according to the ninth embodiments.

In accordance with twelfth embodiments, there is a computer program product comprising a non-transitory computer-readable storage medium having computer readable instructions stored thereon, the computer readable instructions being executable by a computerized device to cause the computerized device to perform a method of controlling uplink antenna selection in a user equipment comprising at least two uplink antennas according to the ninth embodiments.

Further features of embodiments will become apparent from the following description of preferred embodiments, given by way of example only, which is made with reference to the accompanying drawings.

DETAILED DESCRIPTION

Embodiments of the present disclosure provide terminal UL antenna (i.e. UE TX antenna) selection control on the basis of fading conditions. UE TX antenna selection is controlled according to information available from modem DL receivers about current and/or historical DL fading conditions in reception. Information which represents current fading conditions can be extracted from a modem DL receiver/s and used to control UE TX antenna selection according to fading conditions.

Embodiments include modem selection where in a vehicle such as a car, a first antenna/modem is located in a right wing mirror of the car and a second antenna/modem is located in a left wing mirror of the vehicle.

In embodiments, an UL TX antenna is preferentially selected to be the antenna where the RX signal is first received. If a signal is first received at a particular RX, then this can indicate that the particular RX has the shortest distance to a BTS. Signals which are received later may have been subject to more reflections than earlier received signals.

In embodiments, LOS and NLOS fading conditions are detected from the delay spread between at least two radio wave signals received at a UE.

With LOS conditions, the probability for reflections is low and the vehicle may be located at a cell edge or in radio shadow within a cell. Therefore in embodiments, if an alternate TX antenna starts to capture radio signals before a current TX antenna, then the TX antenna can be changed to the alternate TX antenna to improve the uplink.

In NLOS conditions, the received signals have a delay spread but the BTS is expected to be close. Therefore in embodiments, the TX antenna need not be altered continuously according to the delay spread.

In embodiments, vehicle gyroscope or steering sensor information associated with vehicle rotation is used as information input to the UL antenna selection process.

In embodiments, fading delay history is used as information input to the UL antenna selection process.

In embodiments, a UE modem extracts information about current fading conditions in one or more radio communication links to the UE.

In embodiments, such fading conditions, as well as one or more of SNR, SIR, UL/DL signal powers (such as RSSI), antenna parameters, lookup table information are used as information input to the UL antenna selection process in order to improve UL data throughput in good SNR conditions and improve cell coverage in weak signal conditions (such as at a cell edge or radio shadow). According to need, optimal TX antenna selection controls are generated and conveyed for signal path selection.

In embodiments, one or more processors may continuously follow radio link parameters and select new UL antenna controls accordingly.

In embodiments, information associated with road design data, such as whether the current or upcoming road is straight or not, its radius, clothoid parameters etc., from a navigation device and/or the cloud and/or vehicle sensor or travel plan/destination information may be used as information input to the UL antenna selection control process.

Embodiments include a method of controlling uplink antenna selection in a user equipment comprising at least two antennas. The method includes, at the user equipment, receiving at least two radio wave signals, detecting fading conditions in relation to the received at least two radio wave signals, and controlling uplink antenna selection in the user equipment at least on the basis of the detected fading conditions.

By controlling uplink antenna selection according to fading conditions, embodiments provide performance benefits in different fading conditions. The uplink antenna selection control of embodiments provides improved communication quality and/or increased bitrates.

In embodiments, detecting the fading conditions includes determining the signal delay spread between the received at least two radio wave signals.

In embodiments, detecting the fading conditions includes determining which of the received at least two radio wave signals is received first.

In embodiments, detecting the fading conditions includes determining a predefined fading scenario and the controlling includes controlling uplink antenna selection at least on the basis of the determined fading scenario.

In embodiments, the predefined fading scenario includes one or more of a line-of-sight scenario (or scenarios) and a scattering scenario (or scenarios).

In embodiments, detecting the fading conditions includes measuring at least one fading-related reception parameter and the controlling includes controlling uplink antenna selection at least on the basis of the measured at least one fading-related reception parameter.

In embodiments, the at least one fading-related reception parameter includes at least one parameter indicative of signal propagation conditions on a radio link between the user equipment and a communication counterpart.

In embodiments, the at least one fading-related reception parameter includes at least one parameter indicative of one or more of a fading delay, a Doppler, an angle of arrival, and a polarization.

Embodiments include detecting one or more motion-related characteristics of the user equipment and the controlling includes controlling uplink antenna selection at least on the basis of the detected one or more motion-related characteristics.

In embodiments, the one or more motion-related characteristics include one or more of speed and/or direction characteristics of the user equipment.

In embodiments, the one or more motion-related characteristics include one or more of an angle, a magnitude, a vector, a speed, move/non-move information, a destination, a travel route, and a historical average speed.

Motion-related characteristics can be useful, for example in embodiments where the UE is included in a vehicle such as a car. When a car is not moving, historical data of radio path properties can be used for a longer time than when the car is moving. When a car is moving, then historical data of radio path properties can be used according to the speed of the car. When the car is moving at a high speed, using historical data of radio path properties can lead to poor results and thus would typically not be employed, for example above a certain speed threshold.

Embodiments include detecting one or more incoming signal quality parameters associated with at least one radio wave signal received at the user equipment and the controlling includes controlling uplink antenna selection at least on the basis of the detected one or more incoming signal quality parameters.

In embodiments, the one or more incoming signal quality parameters include one or more of a received signal strength indicator, a fading received signal strength indicator, a fading duration, a bit error rate, a quality of service parameter, a signal to noise ratio, and a signal to interference ratio.

Embodiments include detecting one or more uplink quality parameters of network signalling associated with at least one radio wave signal transmitted from the user equipment, and the controlling includes controlling uplink antenna selection at least on the basis of the detected one or more uplink quality parameters.

In embodiments, the one or more detected uplink quality parameters include at least one parameter indicative of one or more of a power level, a modulation, and a data class, a MIMO class, a carrier aggregation combination, and active antenna information.

Embodiments include controlling uplink antenna selection in the user equipment at least on the basis of historical fading conditions associated with two or more radio wave signals received at the user equipment.

In embodiments, the method is operable at or by an apparatus which is mounted or mountable on a mobile device operable in communication with at least one of an access point of a communication system and another mobile device, wherein the mobile device includes at least one of a vehicle, a computer, a satellite, a communication equipment, a communication terminal equipment, a consumer communication device, a military communication device and a public safety communication device.

Figure 1:
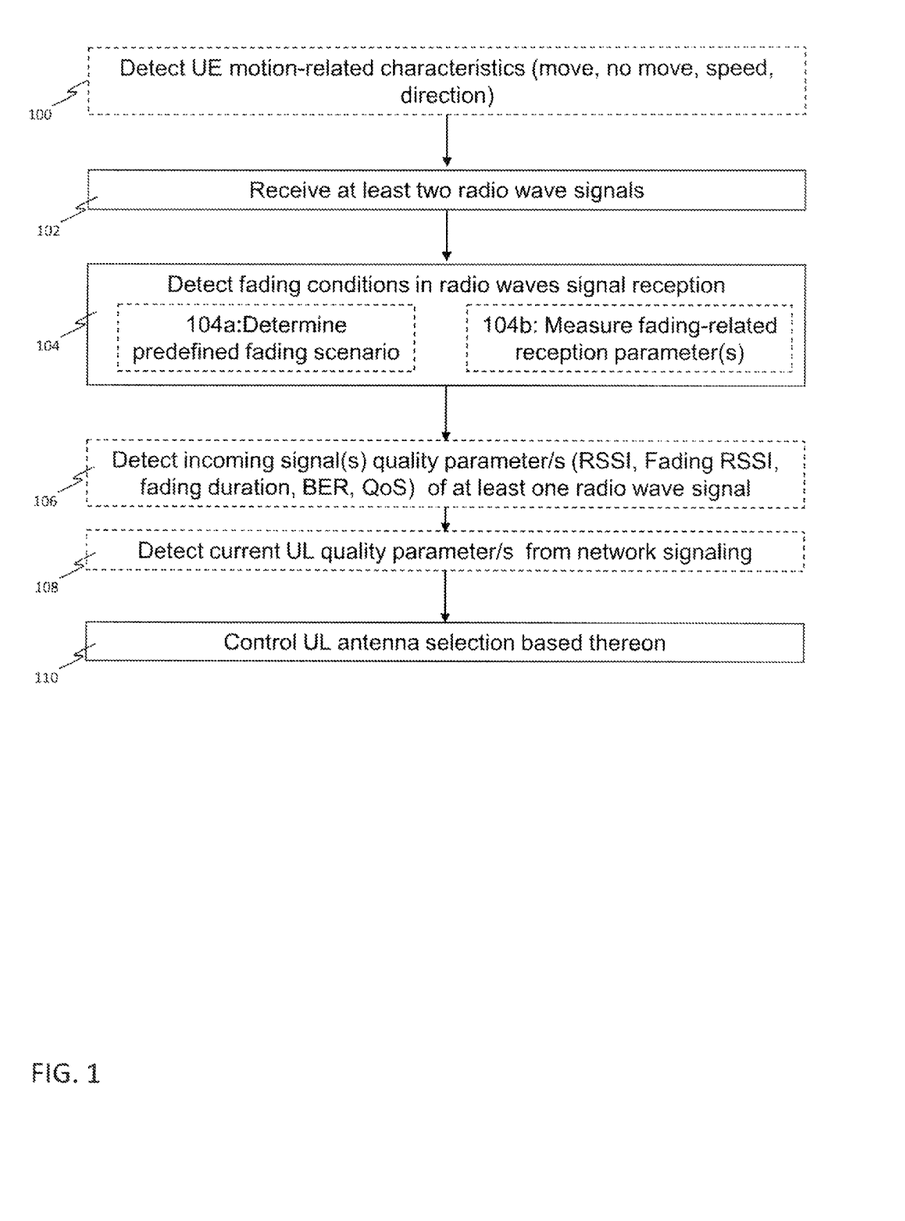
FIG. 1 shows a flowchart according to embodiments of the present disclosure.

FIG. 1 shows a flowchart according to embodiments of the present disclosure. In particular, FIG. 1 shows steps carried out at a user equipment for enabling uplink antenna selection control where the user equipment includes at least two antennas.

In step 102, at least two radio wave signals are received.

In step 104, fading conditions in relation to the received at least two radio wave signals are detected.

In step 110, uplink antenna selection is controlled in the user equipment at least on the basis of the detected fading conditions.

In optional step 100, one or more motion-related characteristics of the user equipment are detected and the controlling includes controlling uplink antenna selection at least on the basis of the detected one or more motion-related characteristics.

In optional step 104a, detecting the fading conditions includes determining a predefined fading scenario In optional step 104b, detecting the fading conditions includes measuring at least one fading-related reception parameter.

In optional step 106, one or more incoming signal quality parameters associated with at least one radio wave signal received at the user equipment are detected and the controlling includes controlling uplink antenna selection at least on the basis of the detected one or more incoming signal quality parameters. The reliability of the above parameters can be taken into account according to how much the frequency separation is between RX frequency/ies and TX frequency/ies. In a TDD communication system, TX and RX are typically at the same frequency. In some embodiments, TDD may be implemented with some frequency separation between TX and RX frequencies, for example to decrease adjacent channel power leakage to neighbor radio access technology communication band(s).

In optional step 108, one or more uplink quality parameters of network signalling associated with at least one radio wave signal transmitted from the user equipment are detected and the controlling includes controlling uplink antenna selection at least on the basis of the detected one or more uplink quality parameters.

Figure 2:
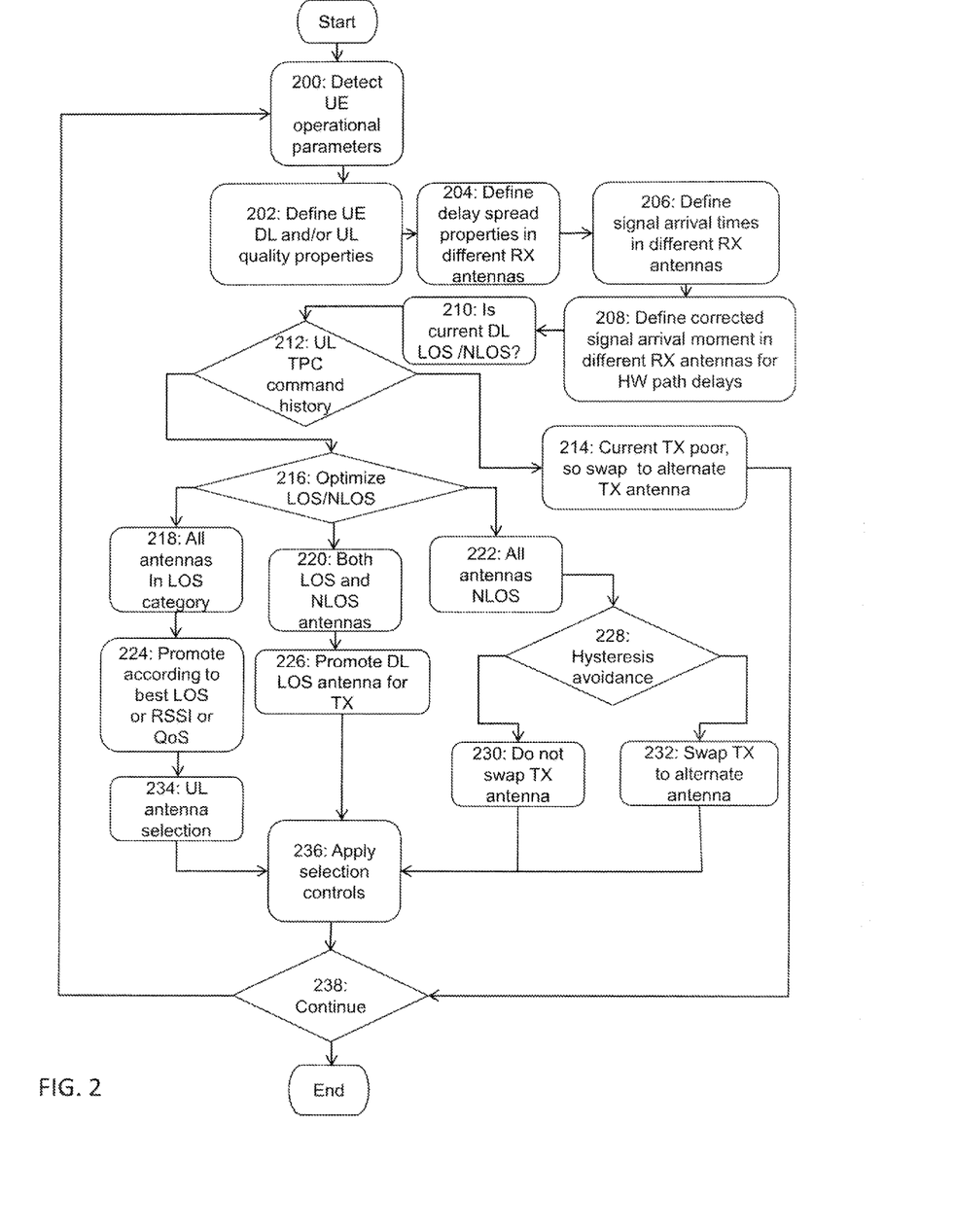
FIG. 2 shows a flowchart according to embodiments of the present disclosure.

FIG. 2 shows a flowchart according to embodiments of the present disclosure. In particular, FIG. 2 shows steps carried out at a user equipment for enabling TX antenna selection control in the user equipment. At step 200, one or more UE operational parameters are detected. At step 202, one or more UE DL and/or UL quality properties are defined. At step 204, delay spread properties for different RX antennas are defined. At step 206, radio wave signal arrival times for different RX antennas are defined. At step 208, corrected radio wave signal arrival moments in different RX antennas are defined to account for HW path delays, for example on the basis of BW, AGC settings, etc. At step 210, it is determined whether the current DL is LOS or NLOS.

At step 212, UL transmission power command history data is processed.

Transmission power commands (TPC) relate to a BTS requesting more or requesting less output transmit power of a UE. If BTS TPC command steps request continuously more power then the UL path is degrading, for example due to the UE moving to a point where the BTS receiver is seeing a fading notch. Alternatively, the UE may be moving closer to a cell edge or there is an object in the signal path which causes attenuation in the UL.

If processing of the UL transmission power command history indicates that the current TX is a poor selection, then a swap to an alternate TX antenna is carried out in step 214 and the control process proceeds on to step 238.

If processing of the UL transmission power command history indicates that the current TX is not a poor selection, then optimisation according to LOS and NLOS conditions is performed in step 216. If all of the antennas are in the LOS category as per step 218, then a TX antenna is promoted according to the best LOS, RSSI or QoS metric in step 224. If the antennas include both LOS and NLOS category antennas as per step 220, then a DL LOS antennas is promoted for TX in step 226. If all of the antennas are in the NLOS category as per step 222, then a hysteresis avoidance process is carried out in step 228, resulting in either the TX antenna not being swapped in step 230 or the TX antenna being swapped in step 232.

The hysteresis avoidance process is carried out in order to avoid a 'ping-pong' effect of repeated switching between different TX antennas; this process can involve TX antenna selection being carried out according to a history log and/or predefined switching threshold.

In step 234, UL antenna selection is carried out.

TX antenna selection controls are then applied in step 236 and the process moves on to step 238. In step 238, TX antenna selection control either continues in step 200 or ends.

In embodiments, DL transmission to the UE is multiple-input and multiple-output (MIMO), whereas UL transmission is single-input and single-output (SISO). In embodiments, uplink antenna selection at the UE includes selecting a single TX antenna (from multiple antennas of the UE) which is to be used for uplink transmission, i.e. SISO transmission, from the UE.

Embodiments include measures for controlling uplink antenna selection in a UE comprising at least two antennas. At the UE, at least two radio wave signals are received. At the UE, fading conditions in relation to the received at least two radio wave signals are detected. At the UE, uplink antenna selection for SISO uplink transmission from the UE is controlled at least on the basis of the detected fading conditions. In such embodiments, detecting the fading conditions includes determining a predefined fading scenario, the controlling includes controlling uplink antenna selection at least on the basis of the determined fading scenario, and the predefined fading scenario includes one or more of a line-of-sight scenario and a scattering scenario. Detecting the fading conditions may for example include determining the signal delay spread between the received at least two radio wave signals. In such embodiments, the controlling of uplink antenna selection may for example include controlling selection of a single uplink antenna from multiple uplink antennas of the UE for performing SISO uplink transmission from the UE.

Embodiments include, at a UE, controlling uplink antenna selection to select between one of two uplink antennas in the UE at least on the basis of fading conditions detected at the UE. In such embodiments, detecting the fading conditions may for example include determining a predefined fading scenario, the controlling may for example include controlling uplink antenna selection at least on the basis of the determined fading scenario, and the predefined fading scenario may for example include one or more of a line-of-sight scenario and a scattering scenario.

Embodiments include, at a UE, controlling uplink antenna selection to select one uplink antenna from two (or possibly more) highly directive antennas of the UE, for example in order to maintain a communication link at a cell edge.

Embodiments described above can be referred to as 'open-loop' embodiments because no information from a BTS about UL signal path properties is fed back to the UE for use in UL antenna selection control.

Embodiments described below can be referred to as 'closed-loop' embodiments because information relating to UL signal reception is fed back to the UE from the BTS for use in UL antenna selection control.

In such closed-loop embodiments, UE transmit antenna selection is carried out according to fading condition information. In embodiments, a preferred UE uplink antenna selection is indicated to the BTS in uplink signalling. In embodiments, the BTS determines a preferred transmit antenna of the terminal device from a terminal classification communicated from the UE to the BTS in connection with registering the UE in the cellular network. For example, a number of alternate TX UL antennas may be communicated from the UE to the BTS in UECapabilityInformation which is a UMTS LTE IE comprising a ue-CapabilityRAT-Container carrying an UE-EUTRA-Capability IE. This IE carries RF Parameters and MeasParameters fields and can be used by the UE device to indicate a preferred TX antenna and any relevant measurement parameters.

In embodiments, the BTS commands a UE transmit antenna port number change to the terminal device.

In embodiments, when the UE transmits information frames or control information or an ACK/NACK to UL, the BTS receives this information. From modem reception at the BTS, information relating to UL frequency signal path properties can be extracted. One or more of the extracted parameters can be shared to the UE or the BTS may proceed to analyse the extracted parameters and share the outcome of the analysis back to the UE. The UE can then use the fed-back information to improve/match subsequent transmissions to the UL signal path.

Embodiments include a method for use in controlling uplink antenna selection in a user equipment comprising at least two antennas. The method includes, at the user equipment, receiving at least two radio wave signals, detecting at least one of fading conditions in relation to the received at least two radio wave signals and one or more motion-related characteristics of the user equipment, transmitting detection information associated with the at least one of detected fading conditions and one or more detected motion-related characteristics towards a network entity, and receiving uplink antenna selection control information from the network entity, the control information having been generated by the network entity at least on the basis of the detection information transmitted to the network entity and network reception information extracted by the network entity from at least one radio wave signal transmitted from the user equipment to the network entity.

Embodiments include controlling uplink antenna selection in the user equipment at least on the basis of the received uplink antenna selection control information.

In embodiments, the one or more detected motion-related characteristics include one or more of speed and/or direction characteristics of the user equipment.

In embodiments, the one or more motion-related characteristics include one or more of an angle, a magnitude, a vector, a speed, move/non-move information, a destination, a travel route, and a historical average speed.

In embodiments, the received uplink antenna selection control information defines an uplink antenna port associated with one of the at least two uplink antennas via which uplink communication should be conducted by the user equipment.

In embodiments, detecting the fading conditions includes detecting the signal delay spread between the received at least two radio wave signals.

In embodiments, detecting the fading conditions includes detecting which of the received at least two radio wave signals is received first.

In embodiments, detecting the fading conditions includes determining a predefined fading scenario.

In embodiments, the predefined fading scenario includes one or more of a line-of-sight scenario and a scattering scenario.

In embodiments, detecting the fading conditions includes measuring at least one fading-related reception parameter.

In embodiments, the at least one fading-related reception parameter includes at least one parameter indicative of signal propagation conditions on a radio link between the user equipment and a communication counterpart.

In embodiments, the at least one fading-related reception parameter includes at least one parameter indicative of one or more of a fading delay, a Doppler, an angle of arrival, and a polarization.

In embodiments, the extracted network reception information is associated with one or more of a user equipment antenna port, a received signal strength indicator (RSSI), a fading received signal strength indicator (RSSI), a fading duration, a delay, a Doppler, an angle of arrival, a polarization, a user equipment movement, a user equipment antenna count, active antenna information, a signal to noise ratio (SNR), a signal to interference ratio (SIR), a bit error rate, and a quality of service.

Embodiments include controlling uplink antenna selection in the user equipment at least on the basis of historical fading conditions associated with two or more radio wave signals received at the user equipment.

Embodiments include transmitting an indication of a preferred uplink antenna selection to the network entity, the control information having been generated by the network entity at least on the basis of the preferred uplink antenna selection indicated by the user equipment.

In embodiments, the indication of a preferred uplink antenna selection is transmitted from the user equipment in a UECapabilityInformation message.

In embodiments, the method is operable at or by an apparatus which is mounted or mountable on a mobile device operable in communication with at least one of an access point of a communication system and another mobile device, wherein the mobile device comprises at least one of a vehicle, a computer, a satellite, a communication equipment, and a communication terminal equipment.

Figure 3:
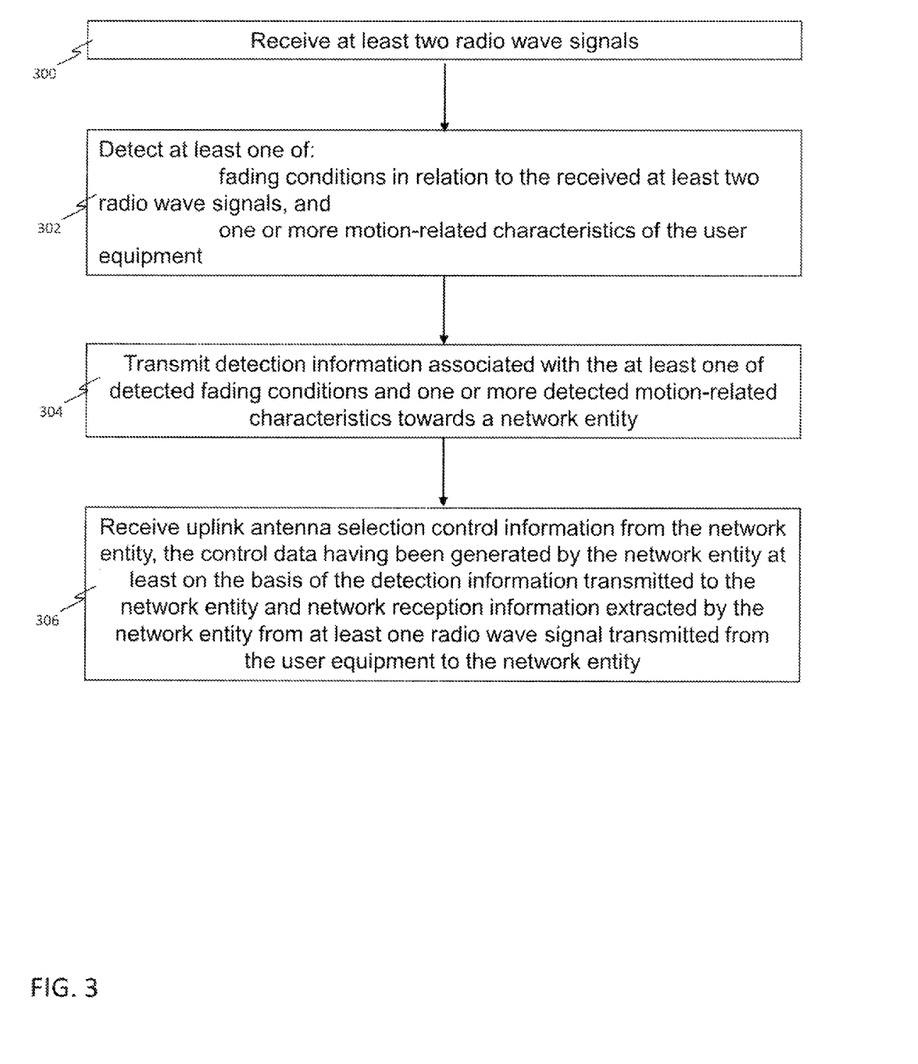
FIG. 3 shows a flowchart according to embodiments of the present disclosure.

FIG. 3 shows a flowchart according to embodiments of the present disclosure. In particular, FIG. 3 shows steps carried out at a user equipment for enabling uplink antenna selection control where the user equipment includes at least two antennas.

In step 300, at least two radio wave signals are received.

In step 302, at least one of fading conditions in relation to the received at least two radio wave signals and one or more motion-related characteristics of the user equipment are detected.

In step 304, detection information associated with the at least one of detected fading conditions and one or more detected motion-related characteristics is transmitted towards a network entity.

In step 306, uplink antenna selection control information is received from the network entity, the control information having been generated by the network entity at least on the basis of the detection information transmitted to the network entity and network reception information extracted by the network entity from at least one radio wave signal transmitted from the user equipment to the network entity.

Embodiments include a method for use in controlling uplink antenna selection in a user equipment comprising at least two antennas. The method includes, at a network entity, receiving detection information transmitted from the user equipment associated with at least one of fading conditions detected by the user equipment in relation to at least two radio wave signals received at the user equipment and one or more motion-related characteristics of the user equipment detected by the user equipment, extracting network reception information from at least one radio wave signal received from the user equipment, generating uplink antenna selection control information at least on the basis of the received detection information and the extracted network reception information, and transmitting the generated uplink antenna selection control information to the user equipment.

In embodiments, the extracted network reception information is extracted from one or more of the following associated with the at least one radio wave signal received from the user equipment payload information, control information, at least one acknowledgement (ACK) message, at least one negative acknowledgement (NACK) message, broadcast information, a channel quality indicator (CQI), a modulation, and an automatic repeat request (ARQ).

In embodiments, the extracted network reception information is associated with one or more of a user equipment antenna port, a received signal strength indicator (RSSI), a fading received signal strength indicator (RSSI), a delay, a Doppler, an angle of arrival, a polarization, a user equipment movement, a user equipment antenna count, active antenna information, a signal to noise ratio (SNR), a signal to interference ratio (SIR), a bit error rate, and a quality of service.

Embodiments include transmitting the extracted network reception information to the user equipment.

Embodiments include receiving an indication of a preferred uplink antenna selection from the user equipment and the generating includes generating the uplink antenna selection control information at least on the basis of the preferred uplink antenna selection indicated by the user equipment.

In embodiments, the indication of a preferred uplink antenna selection is received from the user equipment in a UECapabilityInformation message.

In embodiments, the one or more detected motion-related characteristics include one or more of speed and/or direction characteristics of the user equipment.

In embodiments, the one or more motion-related characteristics include one or more of an angle, a magnitude, a vector, a speed, move/non-move information, a destination, a travel route, and a historical average speed.

In embodiments, the generated uplink antenna selection control information defines an uplink antenna port associated with one of the at least two uplink antennas via which uplink communication should be conducted by the user equipment.

In embodiments, the method is operable at or by an apparatus included in one or more base stations or access nodes of a communication system.

Figure 4:
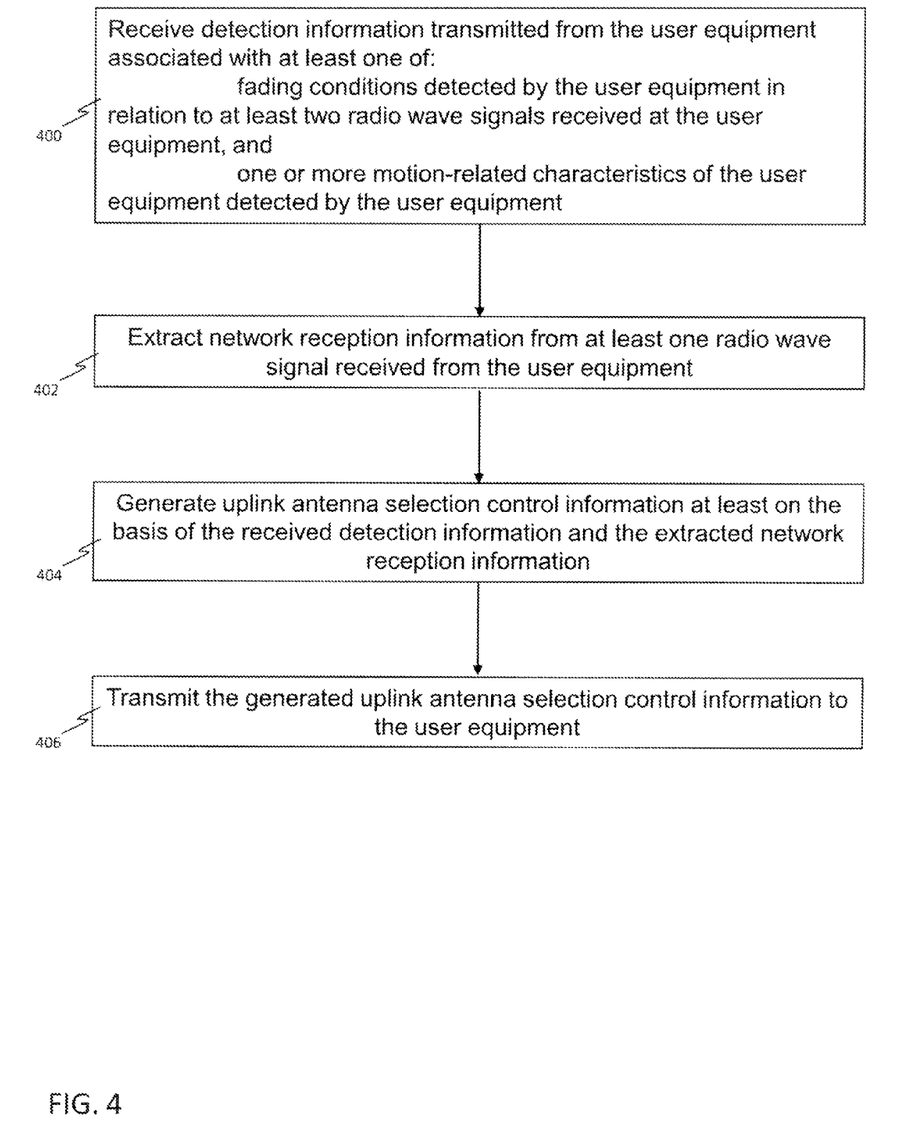
FIG. 4 shows a flowchart according to embodiments of the present disclosure.

FIG. 4 shows a flowchart according to embodiments of the present disclosure. In particular, FIG. 4 shows steps carried out at a network entity for enabling uplink antenna selection control in a user equipment comprising at least two antennas.

In step 400, detection information transmitted from the user equipment is received. The detection information is associated with at least one of fading conditions detected by the user equipment in relation to at least two radio wave signals received at the user equipment and one or more motion-related characteristics of the user equipment detected by the user equipment.

In step 402, network reception information is extracted from at least one radio wave signal received from the user equipment.

In step 404, uplink antenna selection control information is generated at least on the basis of the received detection information and the extracted network reception information.

In step 406, the generated uplink antenna selection control information is transmitted to the user equipment.

Figure 5:
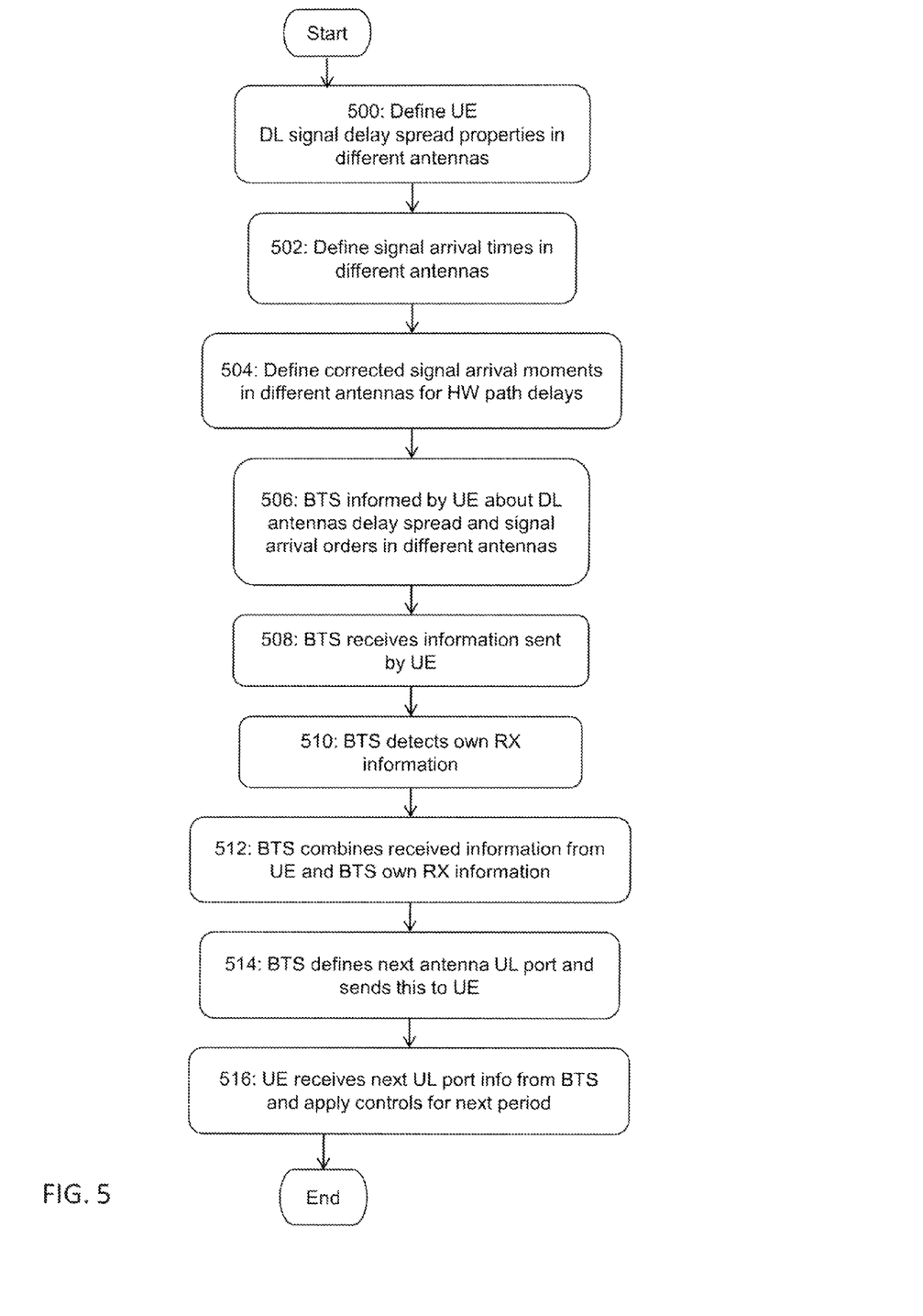
FIG. 5 shows a flowchart according to embodiments of the present disclosure.

FIG. 5 shows a flowchart according to embodiments of the present disclosure. In particular, FIG. 5 shows steps carried out at a network entity for enabling TX antenna selection control in a user equipment.

At step 500, UE DL signal delay spread properties in different antennas are defined. At step 502, signal arrival times in different antennas are defined. At step 504, corrected signal arrival moments in different antennas to account for HW path delays, for example BW, are defined. At step 506, the BTS is informed by the UE about DL antennas delay spread and signal arrival orders in different antennas. At step 508, the BTS receives the information sent by the UE. At step 510, the BTS detects its own RX information. At step 512, the BTS combines the information received from the UE and its own detected RX information. At step 514, the BTS defines the next antenna UL port and sends this information to the UE. At step 516, the UE receives the next UL port information transmitted from the BTS and the UE is thus able to apply UL antennae selection controls for the next period.

The 'next period' refers to a period from one antenna selection to the next antenna selection decision point, where antenna selection is carried out in a repeating loop. Alternatively, the 'next period' may define that the next n frames should be sent from antenna port x and then swap back to transmit from antenna port y or suchlike.

Figure 6:
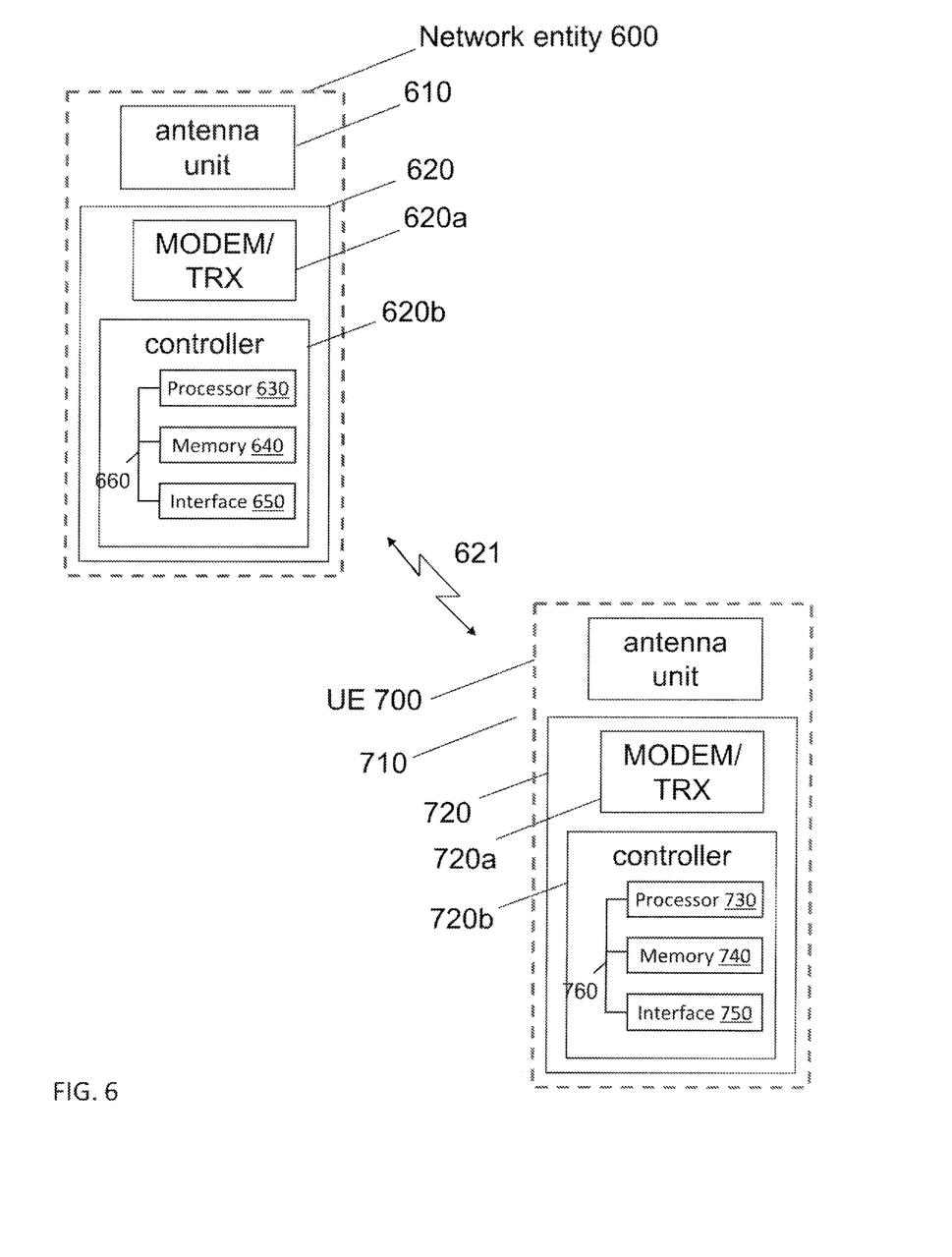
FIG. 6 shows a functional block diagram of apparatus according to embodiments of the present disclosure.

Reference is now made to FIG. 6 which illustrates a simplified block diagram of various electronic devices and apparatus that are suitable for use in a wireless communications network according to embodiments. FIG. 6 includes a network entity apparatus 600 adapted for communication over wireless link 621 with an apparatus 700 such as a mobile terminal or termed more generally as a user equipment UE.

Network entity 600 may comprise one or more of a base station, a base transceiver station, a node B (UMTS) or an e-NodeB (LTE).

Network entity 600 may be further communicatively coupled via a link (not shown) to one or more higher network nodes (not shown), for example including a radio network controller (RNC) in the case of the UMTS system or a mobility management entity/serving gateway MME/S-GW in the case of the LTE system.

As shown in FIG. 6, UE apparatus 700 according to embodiments of the present disclosure includes an antenna unit 710 and a processing unit 720. The processing unit 720 includes a modem/transceiver 720a and a controller 720b.

Antenna unit 710 includes one or more RX and/or TX antennas (not shown). The antenna unit is for example applicable for use as or in an antenna module or an antenna module with electronics or a vehicle factory assembly part, or a vehicle after sale assembly part, or a vehicle service upgrade part, or the like according to embodiments of the present disclosure.

Controlling unit 720b is configured to perform TX antenna selection control according to embodiments of the present disclosure, as described above, i.e. the procedures as exemplified with reference to FIGS. 1 to 3. Component 720a may be realized by a feeding/communication unit which may include at least one of a modem and a transceiver unit (in the case of a transmit/receive antenna or corresponding usage). Component 720b may be realized by a processing system or processor or, as illustrated, by an arrangement of a processor 730, a memory 740 and an interface 750, which are connected by a link or bus 760. Memory 740 may store respective programs assumed to include program instructions or computer program code that, when executed by the processor 730, enable the respective electronic device or apparatus to operate in accordance with the embodiments of the present disclosure. For example, memory 740 may store a computer-readable implementation of a control procedure as illustrated in any of FIGS. 1 to 3. Further, memory 740 may store one or more look-up tables for implementing the control of the TX antenna selection with respect to the one or more parameters used in this regard, such as look-up tables for different combinations of conceivable parameters such as fading scenario and/or fading-related reception parameter/parameters and/or auxiliary data.

Embodiments of this disclosure may be implemented at least in part by computer software stored in memory 740 which is executable by processor 730; or by a processing system; or by hardware, or by a combination of tangibly stored software and hardware (and tangibly stored firmware).

According to embodiments of the present disclosure, all (or some) circuitries required for the aforementioned functionalities may be embedded in the same circuitry, a system in package, a system on chip, a module, a LTCC (Low temperature co-fired ceramic) or the like, as indicated by the dashed line of UE 700 in FIG. 6.

Irrespective of the illustration of FIG. 6, an apparatus (or electronic device) according to embodiments of the present disclosure may include processing unit 720 only, which is connectable to the antenna unit 710, or an apparatus (or electronic device) according to embodiments of the present disclosure may include controlling unit 720b only, which is connectable to antenna unit 710 (via modem/transceiver 720a or not).

According to embodiments of the present disclosure, the control procedure as illustrated in any of FIGS. 1 to 3 may be executed in/by processing unit 720 (i.e. in cooperation between modem/transceiver 720a and controller 720b) or in/by controller 720b as such.

As shown in FIG. 6, network entity apparatus 600 according to embodiments of the present disclosure includes an antenna unit 610 and a processing unit 620, wherein the processing unit 620 includes a modem/transceiver 620a and a controller 620b.

Antenna unit 610 includes one or more RX and/or TX antennas (not shown). The antenna unit is for example applicable for use as or in an antenna module or an antenna module with electronics or the like according to embodiments of the present disclosure.

Controlling unit 620b is configured to perform TX antenna selection control according to embodiments of the present disclosure, as described above, i.e. the procedures as exemplified with reference to FIGS. 4 to 5. Component 620a may be realized by a feeding/communication unit which may include at least one of a modem and a transceiver unit (in the case of a transmit/receive antenna or corresponding usage). Component 620b may be realized by a processing system or processor or, as illustrated, by an arrangement of a processor 630, a memory 640 and an interface 650, which are connected by a link or bus 660. Memory 640 may store respective programs assumed to include program instructions or computer program code that, when executed by the processor 630, enable the respective electronic device or apparatus to operate in accordance with the embodiments of the present disclosure. For example, memory 640 may store a computer-readable implementation of a control procedure as illustrated in any of FIGS. 4 to 5. Further, memory 640 may store one or more look-up tables for implementing the control of the TX antenna selection with respect to the one or more parameters used in this regard, such as look-up tables for different combinations of conceivable parameters such as fading scenario and/or fading-related reception parameter/parameters and/or auxiliary data.

Embodiments may be implemented at least in part by computer software stored in memory 640 which is executable by processor 630; or by a processing system; or by hardware, or by a combination of tangibly stored software and hardware (and tangibly stored firmware).

According to embodiments of the present disclosure, all (or some) circuitries required for the aforementioned functionalities may be embedded in the same circuitry, a system in package, a system on chip, a module, a LTCC (Low temperature co-fired ceramic) or the like, as indicated by the dashed line of network entity 600 in FIG. 6.

Irrespective of the illustration of FIG. 6, network entity apparatus 600 (or electronic device) according to embodiments of the present disclosure may include processing unit 620 only, which is connectable to the antenna unit 610, or an apparatus (or electronic device) according to embodiments of the present disclosure may include controlling unit 620b only, which is connectable to antenna unit 610 (via modem/transceiver 620a or not).

According to embodiments of the present disclosure, the control procedure as illustrated in any of FIGS. 4 to 5 may be executed in/by processing unit 620 (i.e. in cooperation between modem/transceiver 620a and controller 620b) or in/by controller 620b as such.

The communication counterpart of various claims to which UE apparatus 700 is to transmit and/or from which UE apparatus 700 is to receive, may be any entity operable to communicate with the apparatus. In embodiments, the communication counterpart comprises network entity 600 which may comprise a base station or any other access point of a communication system and a mobile device (when the wireless path corresponds to a downlink wireless link) or any mobile device (when the wireless path corresponds to a D2D, V2I, V2V, V2R wireless link).

Electronic devices implementing embodiments need not be the entire UE 700, or network entity 600, but embodiments may be implemented by one or more components of same such as the above described tangibly stored software, hardware, firmware and DP, or a system-on-a-chip SOC or an application specific integrated circuit ASIC or a digital signal processor DSP or a modem or a subscriber identity module (such as a SIM card).

Various embodiments of UE 600 may include, but are not limited to: mobile (or 'cellular') telephones (including so-called "smart phones"), data cards, USB dongles, personal portable digital devices having wireless communication capabilities including but not limited to laptop/palmtop/tablet computers, digital cameras and music devices, sensor network components and Internet appliances. User equipment 100 may also be referred to as a user terminal or endpoint device.

Various embodiments of memories 640, 740 include any data storage technology type which is suitable for the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of processors 630, 730 include but are not limited to microprocessors, digital signal processors (DSPs), multi-core processors, general purpose computers, and special purpose computers.

It will be understood that any of processors 630, 730 or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may include circuitry (as well as possibly firmware) for embodying at least one or more of a data processor or processors, a digital signal processor or processors, baseband circuitry and radio frequency circuitry, which are configurable so as to operate in accordance with embodiments. In this regard, embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings include computer processes performed in processing systems or processors, embodiments also extend to computer software, computer programs, particularly computer programs on or in a carrier, adapted for putting embodiments into practice. The program may be in the form of non-transitory source code, object code, a code intermediate source and object code such as in partially compiled form, or in any other non-transitory form suitable for use in the implementation of processes according to embodiments. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Embodiments include measures, (including methods, apparatus and computer program products) for use in controlling uplink antenna selection in a user equipment comprising at least two antennas.

The method includes, at the user equipment:
receiving at least two radio wave signals;
detecting at least one of:
 fading conditions in relation to the received at least two radio wave signals, and
 one or more motion-related characteristics of the user equipment;
transmitting detection information associated with the at least one of detected fading conditions and one or more detected motion-related characteristics towards a network entity; and
receiving uplink antenna selection control information from the network entity, the control information having been generated by the network entity at least on the basis of the detection information transmitted to the network entity and network reception information extracted by the network entity from at least one radio wave signal transmitted from the user equipment to the network entity.

Embodiments include controlling uplink antenna selection in the user equipment at least on the basis of the received uplink antenna selection control information.

In embodiments, the one or more detected motion-related characteristics include one or more of speed and/or direction characteristics of the user equipment.

In embodiments, the one or more motion-related characteristics include one or more of:
 an angle,
 a magnitude,
 a vector,
 a speed,
 move/non-move information,
 a destination,
 a travel route, and
 a historical average speed.

In embodiments, the received uplink antenna selection control information defines an uplink antenna port associated with one of the at least two uplink antennas via which uplink communication should be conducted by the user equipment.

In embodiments, detecting the fading conditions includes detecting the signal delay spread between the received at least two radio wave signals.

In embodiments, detecting the fading conditions includes detecting which of the received at least two radio wave signals is received first.

In embodiments, detecting the fading conditions includes determining a predefined fading scenario.

In embodiments, the predefined fading scenario includes one or more of a line-of-sight scenario and a scattering scenario.

In embodiments, detecting the fading conditions includes measuring at least one fading-related reception parameter.

In embodiments, the at least one fading-related reception parameter includes at least one parameter indicative of signal propagation conditions on a radio link between the user equipment and a communication counterpart.

In embodiments, the at least one fading-related reception parameter includes at least one parameter indicative of one or more of:
 a fading delay,
 a Doppler,
 an angle of arrival, and
 a polarization.

In embodiments, the extracted network reception information is associated with one or more of:
 a user equipment antenna port,
 a received signal strength indicator (RSSI),
 a fading received signal strength indicator (RSSI),
 a fading duration,
 a delay,
 a Doppler,
 an angle of arrival,
 a polarization,
 a user equipment movement,
 a user equipment antenna count,
 active antenna information,
 a signal to noise ratio (SNR),
 a signal to interference ratio (SIR),
 a bit error rate, and
 a quality of service.

Embodiments include controlling uplink antenna selection in the user equipment at least on the basis of historical fading conditions associated with two or more radio wave signals received at the user equipment.

Embodiments include transmitting an indication of a preferred uplink antenna selection to the network entity, the control information having been generated by the network entity at least on the basis of the preferred uplink antenna selection indicated by the user equipment.

In embodiments, the indication of a preferred uplink antenna selection is transmitted from the user equipment in a UECapabilityInformation message.

In embodiments, the method is operable at or by an apparatus which is mounted or mountable on a mobile device operable in communication with at least one of an access point of a communication system and another mobile device, wherein the mobile device comprises at least one of a vehicle, a computer, a satellite, a communication equipment, and a communication terminal equipment.

The apparatus is adapted to, at the user equipment:
receive at least two radio wave signals;
detect at least one of:
fading conditions in relation to the received at least two radio wave signals, and
one or more motion-related characteristics of the user equipment;
transmit detection information associated with the at least one of detected fading conditions and one or more detected motion-related characteristics towards a network entity; and
receive uplink antenna selection control information from the network entity, the control information having been generated by the network entity at least on the basis of the detection information transmitted to the network entity and network reception information extracted by the network entity from at least one radio wave signal transmitted from the user equipment to the network entity.

In embodiments, the apparatus is adapted to control uplink antenna selection in the user equipment at least on the basis of the received uplink antenna selection control information.

In embodiments, the one or more detected motion-related characteristics include one or more of speed and/or direction characteristics of the user equipment.

In embodiments, the one or more motion-related characteristics include one or more of:
an angle,
a magnitude,
a vector,
a speed,
move/non-move information,
a destination,
a travel route, and
a historical average speed.

In embodiments, the received uplink antenna selection control information defines an uplink antenna port associated with one of the at least two uplink antennas via which uplink communication should be conducted by the user equipment.

In embodiments, detecting the fading conditions includes detecting the signal delay spread between the received at least two radio wave signals.

In embodiments, detecting the fading conditions includes detecting which of the received at least two radio wave signals is received first.

In embodiments, detecting the fading conditions includes determining a predefined fading scenario.

In embodiments, the predefined fading scenario includes one or more of a line-of-sight scenario and a scattering scenario.

In embodiments, detecting the fading conditions includes measuring at least one fading-related reception parameter.

In embodiments, the at least one fading-related reception parameter includes at least one parameter indicative of signal propagation conditions on a radio link between the user equipment and a communication counterpart.

In embodiments, the at least one fading-related reception parameter includes at least one parameter indicative of one or more of:
a fading delay,
a Doppler,
an angle of arrival, and
a polarization.

In embodiments, the extracted network reception information is associated with one or more of:
a user equipment antenna port,
a received signal strength indicator (RSSI),
a fading received signal strength indicator (RSSI),
a fading duration,
a delay,
a Doppler,
an angle of arrival,
a polarization,
a user equipment movement,
a user equipment antenna count,
active antenna information,
a signal to noise ratio (SNR),
a signal to interference ratio (SIR),
a bit error rate, and
a quality of service.

In embodiments, the apparatus is adapted to control uplink antenna selection in the user equipment at least on the basis of historical fading conditions associated with two or more radio wave signals received at the user equipment.

In embodiments, the apparatus is adapted to transmit an indication of a preferred uplink antenna selection to the network entity, the control information having been generated by the network entity at least on the basis of the preferred uplink antenna selection indicated by the user equipment.

In embodiments, the indication of a preferred uplink antenna selection is transmitted from the user equipment in a UECapabilityInformation message.

In embodiments, the apparatus is mounted or mountable on a mobile device operable in communication with at least one of an access point of a communication system and another mobile device, wherein the mobile device comprises at least one of a vehicle, a computer, a satellite, a communication equipment, and a communication terminal equipment.

In embodiments, the apparatus comprises a chipset.

In embodiments, the at least two antennas are located in different sides of a vehicle.

Embodiments include measures (including methods, apparatus and computer program products) for use in controlling uplink antenna selection in a user equipment comprising at least two antennas.

The method includes, at a network entity:
receiving detection information transmitted from the user equipment associated with at least one of:
fading conditions detected by the user equipment in relation to at least two radio wave signals received at the user equipment, and
one or more motion-related characteristics of the user equipment detected by the user equipment;
extracting network reception information from at least one radio wave signal received from the user equipment;
generating uplink antenna selection control information at least on the basis of the received detection information and the extracted network reception information; and
transmitting the generated uplink antenna selection control information to the user equipment.

In embodiments, the extracted network reception information is extracted from one or more of the following associated with the at least one radio wave signal received from the user equipment:
   payload information,
   control information,
   at least one acknowledgement (ACK) message,
   at least one negative acknowledgement (NACK) message,
   broadcast information,
   a channel quality indicator (CQI),
   a modulation, and
   an automatic repeat request (ARQ).

In embodiments, the extracted network reception information is associated with one or more of:
   a user equipment antenna port,
   a received signal strength indicator (RSSI),
   a fading received signal strength indicator (RSSI),
   a fading duration,
   a delay,
   a Doppler,
   an angle of arrival,
   a polarization,
   a user equipment movement,
   a user equipment antenna count,
   active antenna information,
   a signal to noise ratio (SNR),
   a signal to interference ratio (SIR),
   a bit error rate, and
   a quality of service.

Embodiments include transmitting the extracted network reception information to the user equipment.

Embodiments include receiving an indication of a preferred uplink antenna selection from the user equipment, wherein the generating includes generating the uplink antenna selection control information at least on the basis of the preferred uplink antenna selection indicated by the user equipment.

In embodiments, the indication of a preferred uplink antenna selection is received from the user equipment in a UECapabilityInformation message.

In embodiments, the one or more detected motion-related characteristics include one or more of speed and/or direction characteristics of the user equipment.

In embodiments, the one or more motion-related characteristics include one or more of:
   an angle,
   a magnitude,
   a vector,
   a speed,
   move/non-move information,
   a destination,
   a travel route, and
   a historical average speed.

In embodiments, the generated uplink antenna selection control information defines an uplink antenna port associated with one of the at least two uplink antennas via which uplink communication should be conducted by the user equipment.

In embodiments, the method is operable at or by an apparatus included in one or more base stations or access nodes of a communication system.

The apparatus is adapted to, at a network entity:
   receive detection information transmitted from the user equipment associated with at least one of:
      fading conditions detected by the user equipment in relation to at least two radio wave signals received at the user equipment, and
      one or more motion-related characteristics of the user equipment detect by the user equipment;
   extract network reception information from at least one radio wave signal received from the user equipment;
   generate uplink antenna selection control information at least on the basis of the received detection information and the extracted network reception information; and
   transmit the generated uplink antenna selection control information to the user equipment.

In embodiments, the apparatus is adapted to extract the network reception information from one or more of the following associated with the at least one radio wave signal received from the user equipment: payload information,
   control information,
   at least one acknowledgement (ACK) message,
   at least one negative acknowledgement (NACK) message,
   broadcast information,
   a channel quality indicator (CQI),
   a modulation, and
   an automatic repeat request (ARQ).

In embodiments, the extracted network reception information is associated with one or more of:
   a user equipment antenna port,
   a received signal strength indicator (RSSI),
   a fading received signal strength indicator (RSSI),
   a fading duration,
   a delay,
   a Doppler,
   an angle of arrival,
   a polarization,
   a user equipment movement,
   a user equipment antenna count,
   active antenna information,
   a signal to noise ratio (SNR),
   a signal to interference ratio (SIR),
   a bit error rate, and
   a quality of service.

In embodiments, the apparatus is adapted to transmit the extracted network reception information to the user equipment.

In embodiments, the apparatus is adapted to:
   receive an indication of a preferred uplink antenna selection from the user equipment; and
   generate the uplink antenna selection control information at least on the basis of the preferred uplink antenna selection indicated by the user equipment.

In embodiments, the apparatus is adapted to receive the indication of a preferred uplink antenna selection from the user equipment in a UECapabilityInformation message.

In embodiments, the one or more detected motion-related characteristics include one or more of speed and/or direction characteristics of the user equipment.

In embodiments, the one or more motion-related characteristics include one or more of:
   an angle,
   a magnitude,
   a vector,
   a speed,
   move/non-move information,
   a destination,
   a travel route, and
   a historical average speed.

In embodiments, the generated uplink antenna selection control information defines an uplink antenna port associated with one of the at least two uplink antennas via which uplink communication should be conducted by the user equipment.

In embodiments, the apparatus is included in one or more base stations or access nodes of a communication system.

In embodiments, the apparatus comprises a chipset.

In embodiments, the at least two antennas are located in different sides of a vehicle.

The above embodiments are to be understood as illustrative examples of embodiments. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

LIST OF ACRONYMS AND ABBREVIATIONS 3G 3rd generation
3GPP 3rd generation partnership project
ACK acknowledgement
BTS base transceiver station
DCI downlink control information
DL downlink
FDD frequency division duplex
HSPA high speed packet access
IE information element
LOS line of sight
LTE long term evolution
LTE CA long term evolution carrier aggregation
MIMO multiple input multiple output
NACK negative acknowledgement
NLOS non line of sight
PDCCH physical downlink control channel
QoS quality of service
RSSI received signal strength indicator
RX receiver
SIR signal to interference ratio
SNR signal to noise ratio
TX transmitter
TDD time division duplex
UE user equipment
UL uplink
UMTS universal mobile telecommunications service

What is claimed is:

1. A method of controlling uplink antenna selection in a user equipment comprising a first antenna and a second antenna, the method comprising:
    determining whether the first antenna is in line-of-sight (LOS) of a signal source;
    determining whether the second antenna is in LOS of the signal source;
    selecting, by circuitry of the user equipment when both the first antenna and the second antenna are in LOS, one of the first antenna and the second antenna as an uplink antenna according to fading conditions of signals received by the first antenna and the second antenna; and
    selecting, by the circuitry when one of the first antenna and the second antenna is in LOS and the other of the first antenna and the second antenna is not in LOS, the one antenna in LOS as the uplink antenna.

2. The method according to claim 1, wherein the selecting according to the fading conditions comprises determining, by the circuitry, which one of the first antenna and the second antenna receives signals with a lower signal delay spread.

3. The method according to claim 1, wherein the selecting according to the fading conditions comprises determining, by the circuitry, which one of the first antenna and the second antenna receives a signal before the other of the first antenna and the second antenna receives the signal.

4. The method according to claim 1, wherein
    the selecting according to the fading conditions comprises measuring, by the circuitry, at least one fading-related reception parameter of the first antenna and the second antenna.

5. The method according to claim 4, wherein the at least one fading-related reception parameter comprises at least one parameter indicative of signal propagation conditions on a radio link between the user equipment and the signal source.

6. The method according to claim 4, wherein the at least one fading-related reception parameter comprises at least one parameter indicative of one or more of:
    a fading delay,
    a Doppler,
    an angle of arrival, and
    a polarization.

7. The method according to claim 1, further comprising:
    detecting one or more motion-related characteristics of the user equipment, wherein
    the selecting according to the fading conditions further comprises selecting according to the detected one or more motion-related characteristics.

8. The method according to claim 7, wherein the one or more motion related characteristics comprise one or more of speed and/or direction characteristics of the user equipment.

9. The method according to claim 7, wherein the one or more motion related characteristics comprise one or more of:
    an angle,
    a magnitude,
    a vector,
    a speed,
    move/non-move information,
    a destination,
    a travel route, and
    a historical average speed.

10. The method according to claim 1, further comprising:
    detecting one or more incoming signal quality parameters associated with at least one radio wave signal received at the user equipment, wherein
    the selecting according to the fading conditions further comprises selecting according to the detected one or more incoming signal quality parameters.

11. The method according to claim 10, wherein the one or more incoming signal quality parameters comprise one or more of:
    a received signal strength indicator,
    a fading received signal strength indicator,
    a fading duration,
    a bit error rate,
    a quality of service parameter,
    a signal to noise ratio, and
    a signal to interference ratio.

12. The method according to claim 1, further comprising:
    detecting one or more uplink quality parameters of network signaling associated with at least one radio wave signal transmitted from the user equipment,
    wherein the selecting according to the fading conditions further comprises selecting according to the detected one or more uplink quality parameters.

13. The method according to claim 12, wherein the one or more detected uplink quality parameters comprises at least one parameter indicative of one or more of:

a power level,
a modulation,
a data class,
a MIMO class,
a carrier aggregation combination, and
active antenna information.

14. The method according to claim 1,
wherein the selecting according to the fading conditions further comprises selecting according to historical fading conditions associated with two or more radio wave signals received at the user equipment.

15. An apparatus that controls uplink antenna selection, the apparatus comprising:
a first antenna;
a second antenna; and
control circuitry that
determines whether the first antenna is in line-of-sight (LOS) of a signal source;
determines whether the second antenna is in LOS of the signal source;
selects, when both the first antenna and the second antenna are in LOS, one of the first antenna and the second antenna as an uplink antenna according to fading conditions of signals received by the first antenna and the second antenna; and
selects, when one of the first antenna and the second antenna is in LOS and the other of the first antenna and the second antenna is not in LOS, the one antenna in LOS as the uplink antenna.

16. The apparatus according to claim 15, further comprising:
an interface such that the apparatus is mounted or mountable on a mobile device in communication with at least one of an access point of a communication system and another mobile device, wherein
the mobile device comprises at least one of a vehicle, a computer, a satellite, a communication equipment, a communication terminal equipment, a consumer communication device, a military communication device and a public safety communication device.

17. The apparatus according to claim 15, wherein the first antenna and the second antenna are located at different sides of a vehicle.

18. A non-transitory computer-readable storage medium storing computer readable instructions that, when executed by a computerized device including a first antenna and a second antenna, cause the computerized device to:
determine whether the first antenna is in line-of-sight (LOS) of a signal source;
determine whether the second antenna is in LOS of the signal source;
select, when both the first antenna and the second antenna are in LOS, one of the first antenna and the second antenna as an uplink antenna according to fading conditions of signals received by the first antenna and the second antenna; and
select, when one of the first antenna and the second antenna is in LOS and the other of the first antenna and the second antenna is not in LOS, the one antenna in LOS as the uplink antenna.

19. The apparatus according to claim 15, wherein the control circuitry, to select according to the fading conditions, determines which one of the first antenna and the second antenna receives signals with a lower signal delay spread.

20. The apparatus according to claim 15, wherein the control circuitry performs a hysteresis avoidance process, when both the first antenna and the second antenna are not in LOS, to select one of the first antenna and the second antenna as the uplink antenna.

21. The apparatus according to claim 15, wherein the control circuitry, to select according to the fading conditions, measures at least one fading-related reception parameter of the first antenna and the second antenna.

22. The apparatus according to claim 15, wherein
the control circuitry detects one or more incoming signal quality parameters associated with at least one radio wave signal received at the user equipment, and
the control circuitry, to select according to the fading conditions, further selects according to the detected one or more incoming signal quality parameters.

* * * * *